(No Model.)

A. A. HONEY.
ELECTROMAGNETIC ADHESIVE DEVICE.

No. 568,682. Patented Sept. 29, 1896.

Witnesses,
S. P. Hollingsworth
Arthur Garner

Inventor,
Albert A. Honey,
by W. T. Howard,
attys.

UNITED STATES PATENT OFFICE.

ALBERT A. HONEY, OF TACOMA, WASHINGTON.

ELECTROMAGNETIC ADHESIVE DEVICE.

SPECIFICATION forming part of Letters Patent No. 568,682, dated September 29, 1896.

Application filed January 25, 1896. Serial No. 576,876. (No model.)

*To all whom it may concern:*

Be it known that I, ALBERT A. HONEY, a citizen of the United States, residing at Tacoma, in the county of Pierce and State of Washington, have invented certain new and useful Improvements in Electromagnetic Adhesive Devices, of which the following is a specification, reference being had to the accompanying drawings, and to the numerals thereon.

My invention relates more particularly to means for increasing the tractile or adhesive power of a locomotive or other motor, a street-car, or the like, my invention being also applicable as a brake for locomotives and trains and street-cars. The device may be used with the driving-wheels of a locomotive-engine or other motor or the wheels of a car or with a train or a series of cars to increase the traction and prevent slip on ascending grades, as a brake on descending grades, as a brake under the conditions for which one is ordinarily used, or whenever temporary increase in the traction between the wheels and rails is desired.

Heretofore electromagnets have been arranged with respect to the rails of the track over which the locomotive or car passes in such a way that the energizing of the electromagnets shall cause the attraction of the locomotive, car, or other structure upon which they are mounted toward the rail with a power equal to the magnetic force developed, thus adding the equivalent of greater weight to the structure and correspondingly increasing the adhesion of its wheels to the rails. This operation I do not seek to effect, my invention relating to means for using the electromagnets directly with parts of the drivers or wheels of the locomotive or other structure near the point of contact with the rails, a metallic connection being thus formed between the electromagnets and the drivers or wheels in such a way as to extend the magnetic force to the actual point of contact between the drivers or wheels and the rails.

Figure 1:
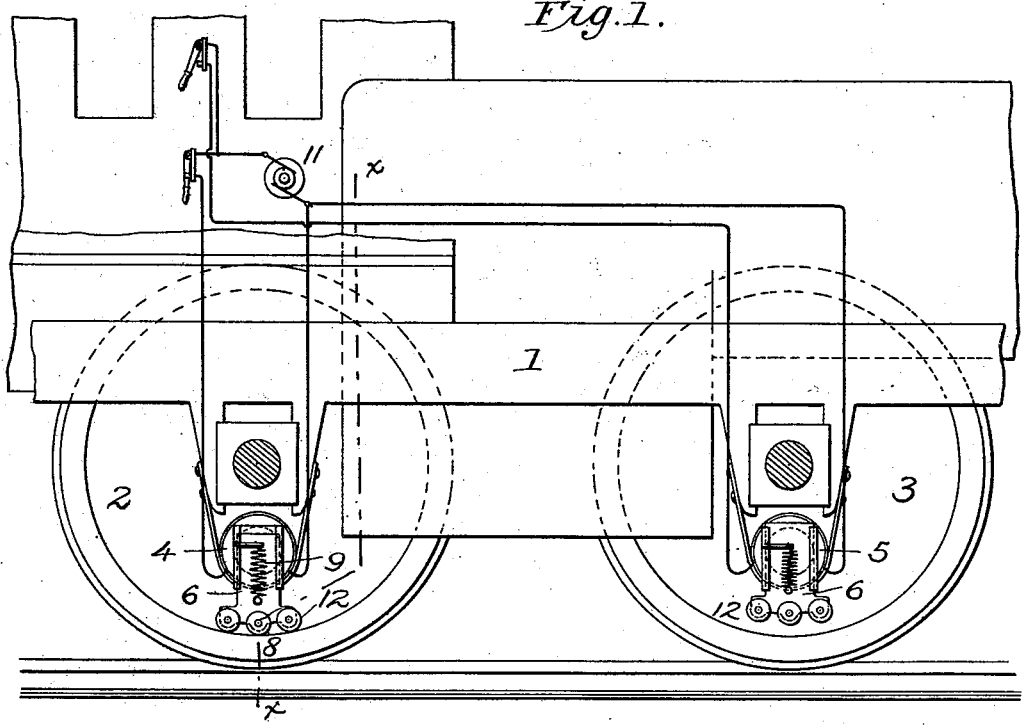
Figure 2:
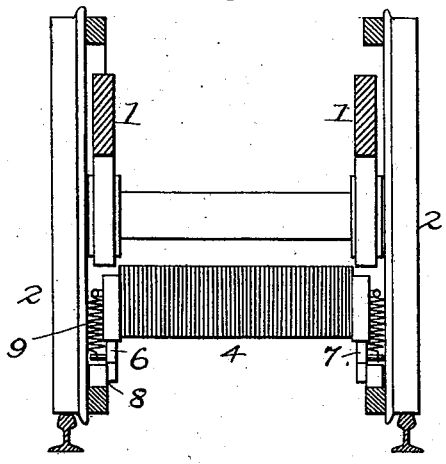
Figure 4:
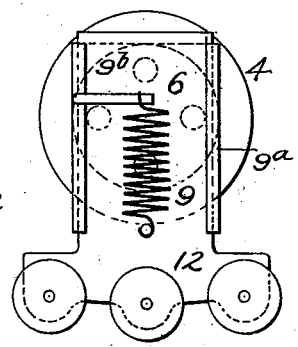
Figure 5:
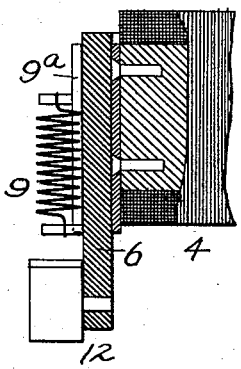
Figure 3:
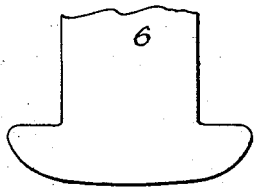

In the accompanying drawings, Figure 1 is a side elevation of a part of a locomotive having my invention applied thereto, the drivers of one side being removed. Fig. 2 is a vertical section on the line $x\,x$ of Fig. 1. Fig. 3 shows a modification, and Figs. 4 and 5 represent details.

Similar numerals of reference indicate similar parts in the respective figures.

1 shows the frame of a locomotive to which my invention is here seen applied. The two drivers of one side of the locomotive are represented by 2 3.

4 5 indicate electromagnets, shown as placed between the drivers 2 2 and 3 3 and parallel to the axles thereof. The electromagnets are rigidly supported by the frame 1, and, being of any usual or approved construction, a description thereof, except as to features entering into this invention, need not be given.

A reference to one electromagnet and to its uses and functions will be sufficient to explain the general application, purposes, and operation of both.

Each electromagnet is provided with pole-pieces 6 7, each extending from its end of its electromagnet in a downward direction toward the flange of the adjacent driver or wheel. At the lower end of each pole-piece (say at 6) is a contact 8, which may be in the form of a roller or series of rollers or trolleys 12, as shown in Figs. 1 and 2, or of a brush, as seen in Fig. 3, and which contact is adapted to rest against and make contact with the inner side of the flange of the driver or wheel at the lowermost part of its periphery. The contacts 8 are made yielding through the medium of springs 9, (shown particularly in Fig. 4,) guides 9ª being rigidly secured to the respective ends of the electromagnets, in which the sliding members 9ᵇ move. One end of each spring 9 is attached to the guide 9ª, the other end being connected with the sliding member 9ᵇ.

Normally, or when no current passes through the electromagnet, the contacts are held up from the drivers or wheels by the action of the springs 9; but when the electromagnets are energized by a current from a generator 11, carried by the locomotive or other structure, the magnetic attraction will cause the contacts 8 to bear against the inner side of the flanges of the drivers or wheels, thereby inducing magnetism therein and producing additional adhesion equivalent to the magnetic power developed between the drivers or wheels and the rails. It will be seen that the magnetism is thus made active at or near the point of contact between the wheel and rail, the tractile or adhesive effect being produced with economic expenditure of power.

The arrangement of the source of electricity and the inducing electric circuit for charging the coils of the electromagnets may be varied. Thus the electricity may be derived from a generator carried by the structure or from one situated in a power-house, this condition being that under which the current would be preferably obtained in the use of the invention upon an electrically-propelled car or series of cars, and the source of electricity may be that used in the propulsion of the vehicle or independent of it.

My invention will admit of further changes in construction within the skill of the mechanic, not involving invention, and I do not limit myself to the exact details herein described and shown.

Having described my invention, I claim—

1. In a device for increasing the tractile or adhesive power between wheels and rails, the combination of a frame, a pair of wheels united by an axle and adapted to revolve in or upon said frame, an electromagnet supported by said frame between said wheels, a pole-piece at each end of said electromagnet, the outer end of which pole-piece is provided with a contact or brush, means for normally withdrawing said contacts or brushes from contact with the wheels, and a source of electricity and suitable circuit-wires, whereby, when the electromagnet is energized, the contacts shall be attracted to the wheels and the magnetic force extended to the actual point of contact between the wheels and the rails, substantially as set forth.

2. In a device for increasing the tractile or adhesive power between wheels and rails, the combination of a frame, a pair of wheels united by an axle and adapted to revolve in or upon said frame, an electromagnet supported by said frame, a normally-elevated contact or brush at each pole of the electromagnet, which contacts or brushes, when inactive, stand off from the surfaces of the wheels, and a source of electricity and suitable circuit-wires, whereby, when the electromagnet is energized, the contacts shall be attracted to the wheels and the magnetic force extended to the actual point of contact between the wheels and rails, substantially as set forth.

3. In a device for increasing the tractile or adhesive power between wheels and rails, the combination of a frame, a pair of wheels united by an axle and adapted to revolve in or upon said frame, an electromagnet rigidly supported by said frame between said wheels, a pole-piece at each end of said electromagnet, each of said pole-pieces having a sliding member, the outer end of which is provided with a contact or brush, means for normally withdrawing said contacts or brushes from contact with the wheels, and a source of electricity and suitable circuit-wires, whereby, when the electromagnet is energized, the contacts shall be attracted to the wheels and the magnetic force extended to the actual point of contact between the wheels and the rails, substantially as set forth.

In testimony whereof I hereto set my hand and seal.

ALBERT A. HONEY. [L. S.]

Witnesses:
ARTHUR GARNER,
H. E. PARKER.